United States Patent
He et al.

(10) Patent No.: US 7,692,155 B2
(45) Date of Patent: Apr. 6, 2010

(54) THREE-DIMENSIONAL, POSITION-SENSITIVE RADIATION DETECTION

(75) Inventors: Zhong He, Ann Arbor, MI (US); Feng Zhang, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 0 days.

(21) Appl. No.: 12/190,385

(22) Filed: Aug. 12, 2008

(65) Prior Publication Data

US 2009/0114829 A1    May 7, 2009

Related U.S. Application Data

(62) Division of application No. 11/240,404, filed on Sep. 30, 2005, now Pat. No. 7,411,197.

(51) Int. Cl.
G01T 1/24 (2006.01)
(52) U.S. Cl. .................................. 250/370.01
(58) Field of Classification Search ............. 250/370.01
See application file for complete search history.

(56) References Cited

U.S. PATENT DOCUMENTS

| | | | |
|---|---|---|---|
| 5,777,338 | A | 7/1998 | He |
| 7,009,183 | B2 | 3/2006 | Wainer et al. |
| 7,208,740 | B2 | 4/2007 | El-Hanany et al. |

OTHER PUBLICATIONS

He, et al., "1-D Position Sensitive Single Carrier Semiconductor Detectors," *Nuclear Instruments & Methods A*, vol. 380, No. 1-2, pp. 228-231 (1996).

He, et al., "3-D Position Sensitive CdZnTe Gamma-Ray Spectrometers," *Nuclear Instruments & Methods A*, vol. 422, No. 1-3, pp. 173-178 (1999).

He, et al., "Direct Measurement of Product of the Electron Mobility and Mean Free Drift Time of CdZnTe Semiconductors Using Position Sensitive Single Polarity Charge Sensing Detectors," *J. Appl. Phys.*, vol. 84, No. 10, p. 5566 (1998).

(Continued)

*Primary Examiner*—David P Porta
*Assistant Examiner*—Marcus H Taningco
(74) *Attorney, Agent, or Firm*—Marshall, Gerstein & Borun LLP

(57) ABSTRACT

Disclosed herein is a method of determining a characteristic of radiation detected by a radiation detector via a multiple-pixel event having a plurality of radiation interactions. The method includes determining a cathode-to-anode signal ratio for a selected interaction of the plurality of radiation interactions based on electron drift time data for the selected interaction, and determining the radiation characteristic for the multiple-pixel event based on both the cathode-to-anode signal ratio and the electron drift time data. In some embodiments, the method further includes determining a correction factor for the radiation characteristic based on an interaction depth of the plurality of radiation interactions, a lateral distance between the selected interaction and a further interaction of the plurality of radiation interactions, and the lateral positioning of the plurality of radiation interactions.

23 Claims, 13 Drawing Sheets

OTHER PUBLICATIONS

He, et al., "Position-Sensitive Single Carrier CdZnTe Detectors," *Nuclear Instruments & Methods A*, vol. 388, No. 1-2, pp. 180-185 (1997).

He, "Review of the Shockley-Ramo Theorem and Its Application in Semiconductor Gamma-Ray Detectors," *Nuclear Instruments & Methods A*, vol. 463, pp. 250-267 (2001).

Li, et al., "A Data Acquisition and Processing System for 3-D Position Sensitive CZT Gamma-ray Spectrometers," *IEEE Transactions on Nuclear Science*, vol. 46, No. 6, pp. 1989-1994 (1999).

Li, et al., "A Modeling Method to Calibrate the Interaction Depth in 3-D Position Sensitive CdZnTe Gamma-Ray Spectrometers," *IEEE Transactions on Nuclear Science*, vol. 47, pp. 890-894 (2000).

Li, et al., "Spatial Variation of Energy Resolution in 3-D Position Sensitive CZT Gamma-Ray Spectrometers," *IEEE Transactions on Nuclear Science,*, vol. 46, pp. 187-192 (1999).

Li, Three-Dimensional Position Sensitive CdZnTe Gamma Ray Spectrometers, University of Michigan doctoral thesis, (2001).

Zhang, et al., "3D Position Sensitive CdZnTe Spectrometer Performance Using Third Generation VAS/TAT Readout Electronics," *IEEE Transactions on Nuclear Science*, (2005).

Zhang, et al., *Events Reconstruction in 3-D Position Sensitive CdZnTe Gamma Ray Spectrometers*, University of Michigan doctoral thesis, pp. 73, 76, 79-104, 149-151 (2005).

Zhang, et al., "Improved Resolution for 3D Position Sensitive CdZnTe Spectrometers," *IEEE Transactions on Nuclear Science*, vol. 51, No. 5, pp. 2427-2431 (2004).

THREE-DIMENSIONAL, POSITION-SENSITIVE RADIATION DETECTION

STATEMENT REGARDING FEDERALLY SPONSORED RESEARCH OR DEVELOPMENT

This invention was made with government support under Contract No.: DE-FG03-01NN20122 awarded by Department of Energy. The government has certain rights in the invention.

BACKGROUND OF THE DISCLOSURE

1. Field of the Disclosure

The disclosure relates generally to radiation detection and, more particularly, to three-dimensional, ionization-based radiation detection.

2. Brief Description of Related Technology

In view of the variety of ways in which radiation is generated and encountered, radiation detectors have been used to determine a number of different characteristics of the radiation, including radiation type, energy, source (e.g., the isotopes emitting the radiation), source intensity, and source location. The two main types of radiation—neutral particles such as photons (x-rays and gamma rays) and neutrons, and charged particles such as fast moving electrons and protons—have generally been detected with three types of radiation detectors, namely gas, scintillation and semiconductor detectors.

When gamma rays interact with a detector medium, charge carriers (e.g., electrons) are generated via electron ionization. The initial kinetic energy of the electrons equals the energy loss of the gamma ray. Furthermore, the number of created charge carriers is proportional to the energy deposition of each interaction. Both negative and positive charge carriers, such as electrons and holes in a semiconductor device, then move toward, and are eventually collected by, an anode (a positively biased electrode) and a cathode (a negatively biased electrode), respectively. The induced signals on the electrodes are proportional to the number of charge carriers. As a result, the amount of energy deposition has generally been determined by measuring the amplitude of the induced signal on an electrode.

Semiconductor detectors are favorable in gamma ray detection for their high atomic number, high density and low ionization energy for generating each free-moving charge carrier. Unfortunately, each currently available semiconductor medium presents limitations. Silicon detectors, for instance, have fairly low atomic number and the typical thickness is only a few millimeters. With the resulting low detection efficiency for gamma rays, silicon detectors are normally used to detect x-rays and charged particles. Other options include high-purity germanium detectors, which present a modest atomic number and good density, and can be produced in large sensitive volumes. While achieving excellent energy resolution and high detection efficiency for gamma rays, germanium detectors unfortunately require operation at liquid nitrogen temperatures to avoid spurious signals arising from a small band-gap energy.

Wide band-gap semiconductor materials, especially CdZnTe (CZT), have potential for both good energy resolution and compatibility with room-temperature operation. However, a number of challenges are presented by these room-temperature semiconductor detectors. Holes in CdZnTe move very slowly and are easily trapped, and thus contribute little, if at all, to the induced signal. As a result, the induced signal is mainly contributed by the movement of electrons, which, in turn, makes the signal amplitude dependent on the drift length of the electrons. Even for the same energy deposition, the induced signal then has a different amplitude depending on where the electrons are created. Various methods have been proposed and evaluated to overcome this problem, such as pulse shape discrimination, pulse compensation, and single-polarity charge sensing techniques. Unfortunately, the electrons can also be trapped during their drift to the anode, causing a deficit in the induced signal amplitude. Techniques using an optimized relative gain between two anodes and depth sensing have been proposed to address this electron trapping effect. Unfortunately, the energy resolution has remained far worse than the theoretical limit due to material non-uniformity.

Single-polarity charge sensing techniques, such as coplanar or pixelated anodes, have been utilized to minimize the hole-trapping problem and improve the energy resolution for larger volume detectors. Unfortunately, these techniques were still limited by problems arising from material non-uniformity and spatially varying electron trapping, thereby limiting the energy resolution of, for instance, co-planar grid detectors.

More recently, the foregoing challenges were addressed in the development of three-dimensional CZT spectrometers by He et al. and Li et al. See, for example, Z. He, et al. "3-D position sensitive CdZnTe gamma-ray spectrometers," Nucl. Instrum. Meth. A, vol. 422, pp. 173-178 (1999) and W. Li, et al., "A data acquisition and processing system for 3-D position sensitive CZT gamma-ray spectrometers," IEEE Trans. Nucl. Sci., vol. 46, pp. 1989-1994 (1999). By determining the three-dimensional (3-D) position information for a single-pixel event, the material non-uniformity and varying electron trapping effects were addressed. Unfortunately, these devices were incapable of correctly determining the information for multiple-pixel events.

SUMMARY OF THE DISCLOSURE

In accordance with one aspect of the disclosure, a method is useful for determining a characteristic of radiation detected by a radiation detector via a multiple-pixel event having a plurality of radiation interactions. The method includes determining a cathode-to-anode signal ratio for a selected interaction of the plurality of radiation interactions based on electron drift time data for the selected interaction, and determining the radiation characteristic for the multiple-pixel event based on the cathode-to-anode signal ratio.

In some cases, the method further includes determining the electron drift time data for the selected interaction, such that the radiation characteristic is determined based on both the cathode-to-anode signal ratio and the electron drift time data.

The radiation characteristic may correspond with an interaction depth within the radiation detector of the selected interaction. Alternatively, the radiation characteristic corresponds with an energy deposited by the radiation. The radiation characteristic determination may then include correcting data for the energy utilizing a correction coefficient based on the cathode-to-anode signal ratio.

In some embodiments, the cathode-to-anode signal ratio determination includes correlating the electron drift time data with the cathode-to-anode signal ratio. The correlation may then include the step of accessing a calibration look-up table correlating electron drift times with corresponding cathode-to-anode signal ratios. The corresponding cathode-to-anode signal ratios may be based on empirical data from single-pixel interaction events, and the calibration look-up table may specify a number of energy correction factors corresponding with the cathode-to-anode signal ratios. The energy correction factors may be anode pixel-specific.

In some cases, the method further includes adjusting the radiation characteristic to correct for a crosstalk effect between the plurality of radiation interactions. The correction factor determination may include combining multiple correction factors corresponding with multiple respective pixel pairs of the radiation detector with which the radiation interacts in the multiple-pixel event.

In some embodiments, the method further includes determining a correction factor for the radiation characteristic based on a centroid depth of the plurality of radiation interactions.

Alternatively or in addition, the method further includes determining a correction factor for the radiation characteristic based on a distance between a pair of pixels of the radiation detector with which the radiation interacts in the multiple-pixel event.

Alternatively or in addition, the method further includes determining a correction factor for the radiation characteristic based on lateral positioning of a pair of pixels of the radiation detector with which the radiation interacts in the multiple-pixel event. The correction factor determination may include determining whether one or both of the pair of pixels are disposed along an anode periphery.

In an alternative embodiments, the method further includes determining a correction factor for the determined radiation characteristic based on an interaction depth of the plurality of radiation interactions, and a lateral distance between the selected interaction and a further interaction of the plurality of radiation interactions. The correction factor may be further based on a lateral position of the selected interaction.

In accordance with another aspect of the disclosure, a radiation detector is useful for detecting a multiple-pixel event having a plurality of radiation interactions. The radiation detector includes a first data processing module that generates electron drift time data from anode and cathode signals arising from the plurality of radiation interactions, and a second data processing module that accesses a first data correlation of electron drift times with cathode-to-anode signal ratios and a second data correlation of cathode-to-anode signal ratios with correction factor values for a radiation characteristic for the multiple-pixel event. The second data processing module determines the radiation characteristic based on the electron drift time data, the first data correlation and the second data correlation.

In some cases, the second data processing module also determines an interaction depth for a selected radiation interaction of the plurality of radiation interactions based on the electron drift time data and the first data correlation. The second data processing system may further determine a distance between a first pixel of the radiation detector associated with the selected radiation interaction and a second pixel with which the radiation also interacts in the multiple-pixel event. The second data processing system may then also access a third data correlation to determine a further correction factor for the radiation characteristic based on the interaction depth and the distance between the first and second pixels. The third data correlation may specify values for the further correction factor based on lateral positioning of the first and second pixels. The values for the further correction factor may vary based on whether one or both of the first and second pixels are disposed along an anode periphery or within a central anode area.

In accordance with yet another aspect of the disclosure, a method of calibrating a radiation detector using a radiation source having a known energy level includes determining a lateral distance between anode pixels of the radiation detector involved in a multiple-pixel event arising from radiation from the radiation source interacting with the radiation detector, calculating a multiple-pixel event correction factor value based on the known energy level of the radiation source, and storing the calculated correction factor value in association with the lateral distance for the multiple-pixel event.

In some cases, the method further includes determining respective interaction depths for first and second interactions of the multiple-pixel event, and storing the calculated correction factor and the lateral distance in association with the respective interaction depths. The method may then further include determining lateral position data for the first and second interactions such that the calculated correction factor is further stored in association with the lateral position data.

Alternatively or in addition, the method further includes determining a cathode-to-anode signal ratio for a single-pixel event arising from the radiation from the radiation source interacting with the radiation detector, determining an electron drift time for the single-pixel event, and storing a correlation of the electron drift time data and the respective anode-to-cathode signal ratio data. The storing step may include storing a radiation energy correction factor for the single-pixel event in connection with the correlation.

In some embodiments, the method further includes determining a centroid depth for the multiple-pixel event and storing the calculated correction factor value in association with the centroid depth.

BRIEF DESCRIPTION OF THE DRAWING FIGURES

For a more complete understanding of the disclosure, reference should be made to the following detailed description and accompanying drawing figures, in which like reference numerals identify like elements in the figures, and in which.

Figure 1:
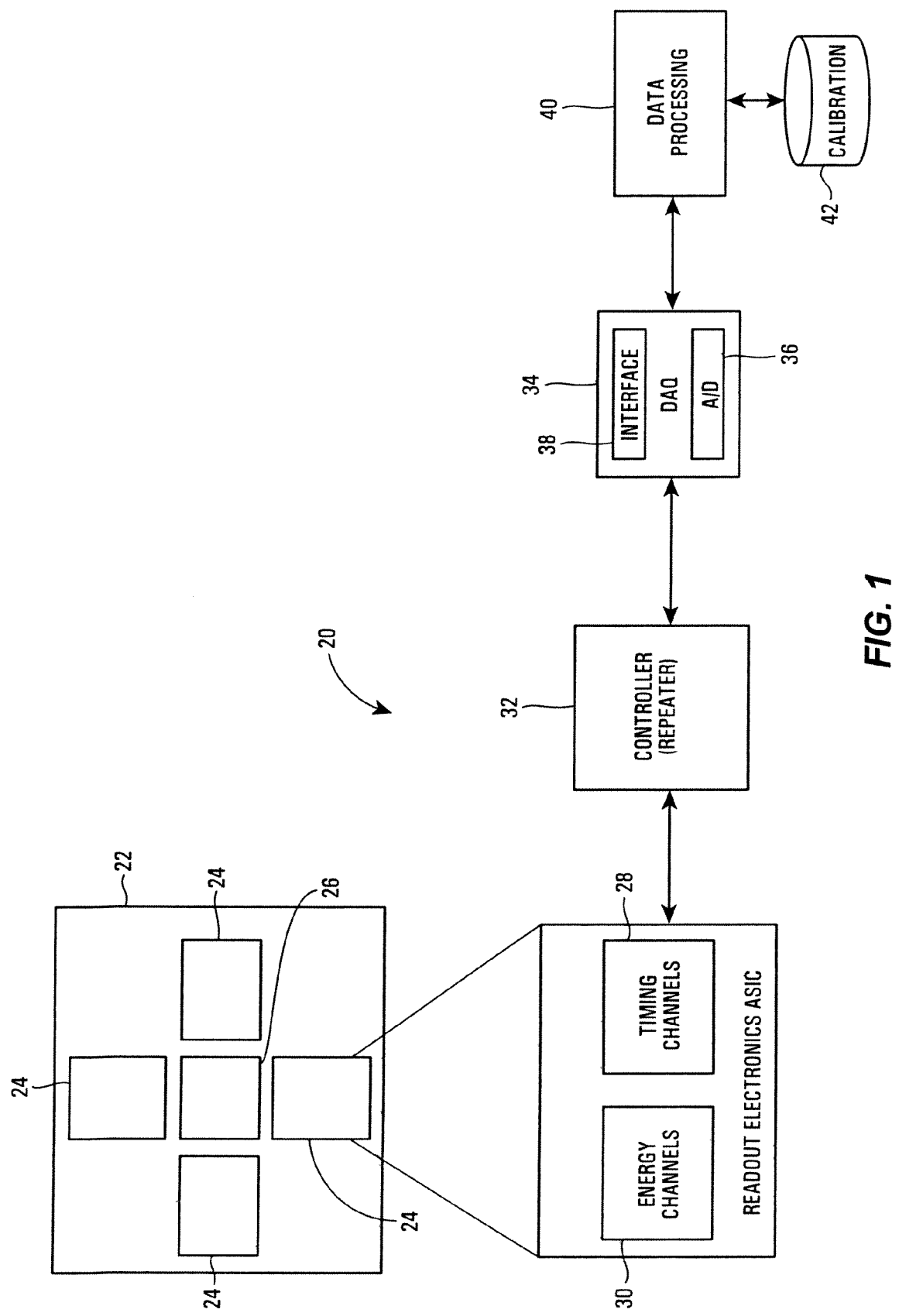
FIG. 1 is a schematic representation of a radiation detector in accordance with one aspect of the disclosure.

While the disclosed system and method are susceptible of embodiments in various forms, there are illustrated in the drawing (and will hereafter be described) specific embodiments of the invention, with the understanding that the disclosure is intended to be illustrative, and is not intended to limit the invention to the specific embodiments described and illustrated herein.

DETAILED DESCRIPTION OF PREFERRED EMBODIMENTS

Described below are three-dimensional radiation spectroscopy techniques for semiconductor-based detectors capable of sensing multiple-pixel events. The disclosed techniques include aspects of both detector calibration and the subsequent data acquisition enabled thereby. Generally speaking, three-dimensional radiation detection in a multiple-pixel event context is supported by the disclosed techniques via one or more correction factors for the calculation of a characteristic of the radiation, such the deposited energy. For example, a first correction factor may be based on a correlation of cathode-to-anode signal ratios and electron drift times. A second correction factor may be based on one or more of the following: the interaction depth, the relative lateral positioning of the interaction, and the lateral distance between interactions. These correction factors are generated as a result of the calibration techniques disclosed herein and, taken together or individually, support the improved resolution of the disclosed radiation detector.

A software platform to implement the disclosed calibration and data acquisition techniques is disclosed herein in conjunction with a physical hardware platform, including circuitry and other devices and equipment for radiation detection via a wide band-gap semiconductor medium. Although described in connection these software and hardware platforms, the disclosed techniques are not limited to practice or implementation with the exemplary hardware and software platforms and architectures described below. For example, the disclosed techniques are also suitable for use in other ionization detection contexts, such as those utilizing gas detectors. Moreover, practice of the disclosed techniques is not limited to any one semiconductor material. Still further, the disclosed techniques may be implemented in a variety of radiation detection applications and contexts, and are not limited to the radiation sources described herein.

With reference now to FIG. 1, an exemplary embodiment of a radiation detector system indicated generally at 20 includes a front-end board 22 having mounted thereon a number of readout electronics circuits (or chipsets) 24 and a detector module 26 having a wide band-gap semiconductor detector medium. In this exemplary case, the detector module 26 may include a CdZnTe detector mounted on a ceramic plate. Practice of the disclosed technique is not limited to any specific semiconductor material, but suitable crystals may be obtained from eV-PRODUCTS (Saxonburg, Pa.). Several exemplary detector module 26, the results of testing of which are discussed below, utilizes crystals with approximate dimensions of $1.5 \times 1.5 \times 1$ cm$^3$.

As described below, the detector module 26 has a pixilated anode having, for instance, an $11 \times 11$ pattern that establishes 121 anode pixels. In this case, the signals from the 121 anode pixels and the cathode are read out by the four readout chipsets 24. In one embodiment, the pixilated anodes of the module 24 are wire-bonded to the readout electronics using an intermediate ceramic substrate (not shown) with plate-through-via(s). The chipsets 24 may be configured in any one of a number of ways known to those skilled in the art, including, for example, as an application-specific integrated circuit (ASIC).

Generally speaking, each chipset 24 has a number of channels used to read out the induced charges on the anode pixels, as well as the cathode. In this specific example, each chipset 24 includes a first ASIC 28 dedicated to timing data acquisition and a second ASIC 30 dedicated to energy data acquisition. Each ASIC 28, 30 includes a number of channels (e.g., 32) for acquiring and capturing data indicative of the radiation interaction events occurring in the detector medium 26. More specifically, the ASIC 28 has a number of channels used to trigger the system 20 and read out electron drift times and, accordingly, may be referred to herein as the Trigger ASIC with Timing, or TAT, ASIC. Similarly, the ASIC 30 has a number of channels to read out signals indicative of the charges induced on the anode pixels and, accordingly, may be referred to herein as the voltage ASIC with stretching, or VAS, ASIC. The two ASICs 28, 30 may be coupled to support communication therebetween in a number of ways. For example, a preamplifier output of each VAS channel may be wire-bonded to an input of a corresponding TAT channel.

More generally, connections between the components mounted on the front-end board 22 may vary based on the system architecture and components, as well as take into consideration factors such as noise suppression. The nature of the connections may vary, for instance, based on the degree to which components of the system 20 are integrated into one chip, board, card, etc. In this exemplary case, conducting traces within the multi-layer ceramic plate connect every anode pixel to a corresponding metal pad (not shown) on the periphery of the plate. A short wire-bond (not shown) then connects each pad on the ceramic plate to the input of each ASIC channel on the front-end board 22.

A controller and repeater card 32 is used to generate and send readout clock signals to the ASICs 28, 30 and also convert the output of each ASIC 28, 30 to a voltage signal for input to a data acquisition (DAQ) board 34, such as the PCI-6110 DAQ board from National Instruments. The DAQ board 34 may provide an A/D converter 36 and a controller interface 38 for further data processing elements 40 of the detector system 20. The data processing elements 40 may implement one or more aspects of the disclosed techniques in conjunction with one or more calibration databases or data sets 42 stored in one or more memories. In some cases, one or more of the calibration data sets may be represented by, or provided via, a fitted or other function, the parameters of which may be stored in the same or different memories of the system 20.

More generally, the data processing elements 40 may include hardware, software, or firmware components, or any combination thereof. In one exemplary case, the data processing steps are coded in C++, and provide for automatic control and implementation of the disclosed techniques.

In some embodiments, the chipsets 24 may include or incorporate the functionality of one or more of the following: peak-hold circuits, triggering circuits with masking, time sensing capability and AC-coupling equivalent circuits. The time-sensing functionality and other signal processing functions provided by the chipsets 24 are described further below.

In operation, each anode pixel location provides the lateral coordinates of a radiation interaction, while cathode/anode signals and electron drift time data are both acquired and used to obtain the interaction depth. As described below, data-acquisition and processing software in accordance with the disclosed techniques may then implement either calibration and, more generally, real-time spectroscopy. The calibration procedures may be completed automatically by the software or manually, as desired. The final results of the calibration procedures may then be fed back to the data acquisition program(s) to support implementation as a real-time 3-D CZT spectrometer with COMPTON imaging capabilities.

Figure 2:
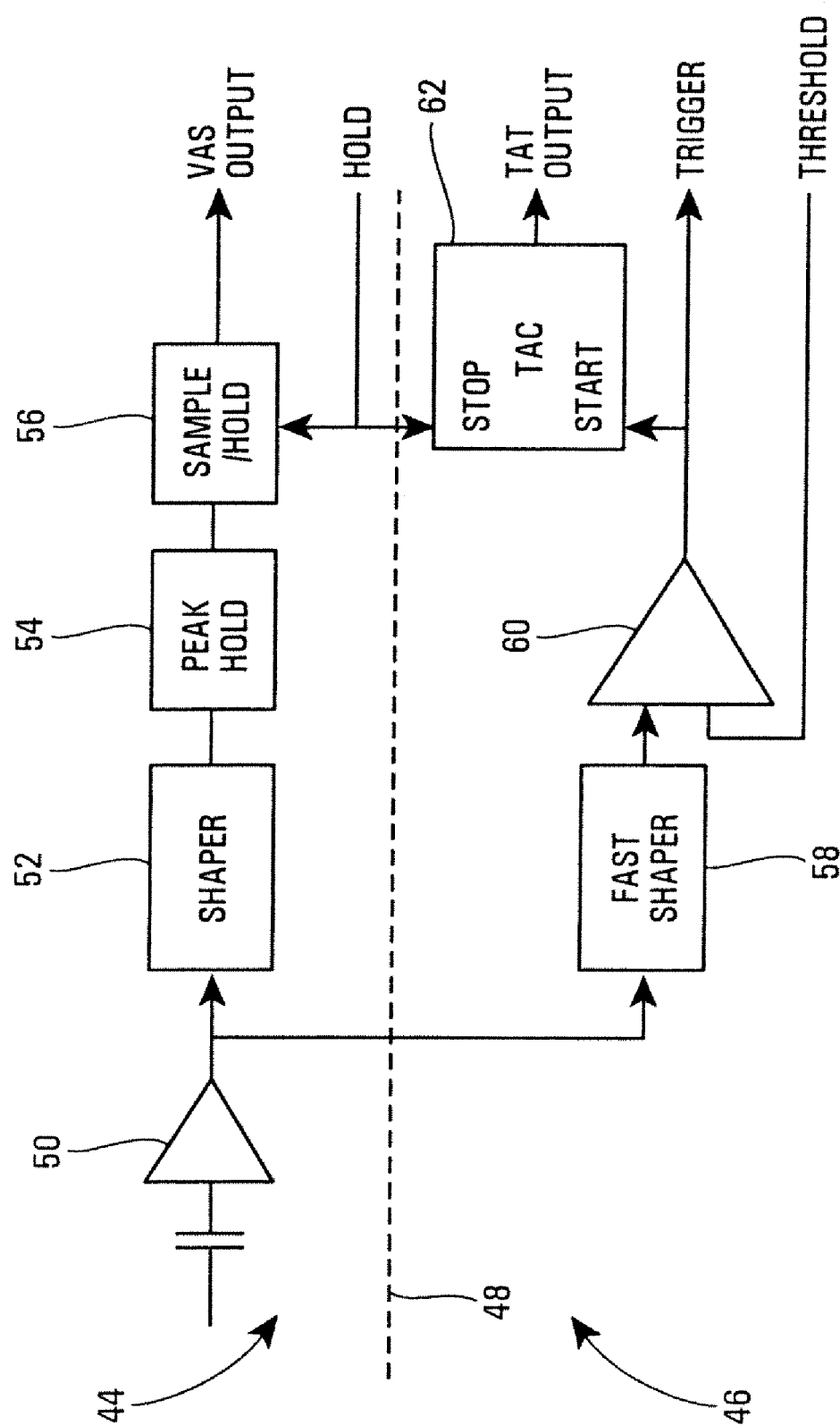
FIG. 2 is a schematic representation of signal readout circuitry of the radiation detector of FIG. 1 in accordance with one embodiment.

With reference now to FIG. 2, further details regarding the ASICs 28, 30 are shown in connection with exemplary VAS and TAT channels indicated generally at 44 and 46, respectively, and separated for convenience in illustration by dashed line 48. In this exemplary embodiment, each independent channel 44 of the VAS ASIC 30 includes a preamplifier 50, a 1-μs time shaping amplifier 52, a peak-hold circuit 54 and a sample-hold circuit 56. The first channel on each VAS chip 30 may have an opposite polarity to the other 31 or 32 channels, in order to read out the signal from the cathode.

Each TAT channel includes a 75-ns-shaping time fast shaper 58, a discriminator 60 for triggering, and a time-to-amplitude converter (TAC) 62 for electron drift time sensing. In some cases, a trigger mask may be set to disable those channels having high noise, if desired.

In operation, the ASICs 28, 30 may reside in two readout modes: a single-channel mode and a serial readout mode. The single-channel mode may be used for system testing in which a multiplexer is set so that one channel is constantly connected to the output and a test pulse generated by the DAQ board 34 is injected into the respective channel. The output of the channel is then read out continuously such that the response of the channel, including voltage and timing responses, to the test pulse can be monitored both in a DAQ program and on an oscilloscope. The serial read out mode may be used to sequentially sample the output of all the channels by the multiplexer being automatically switched channel by channel by the readout clock.

Figure 3:
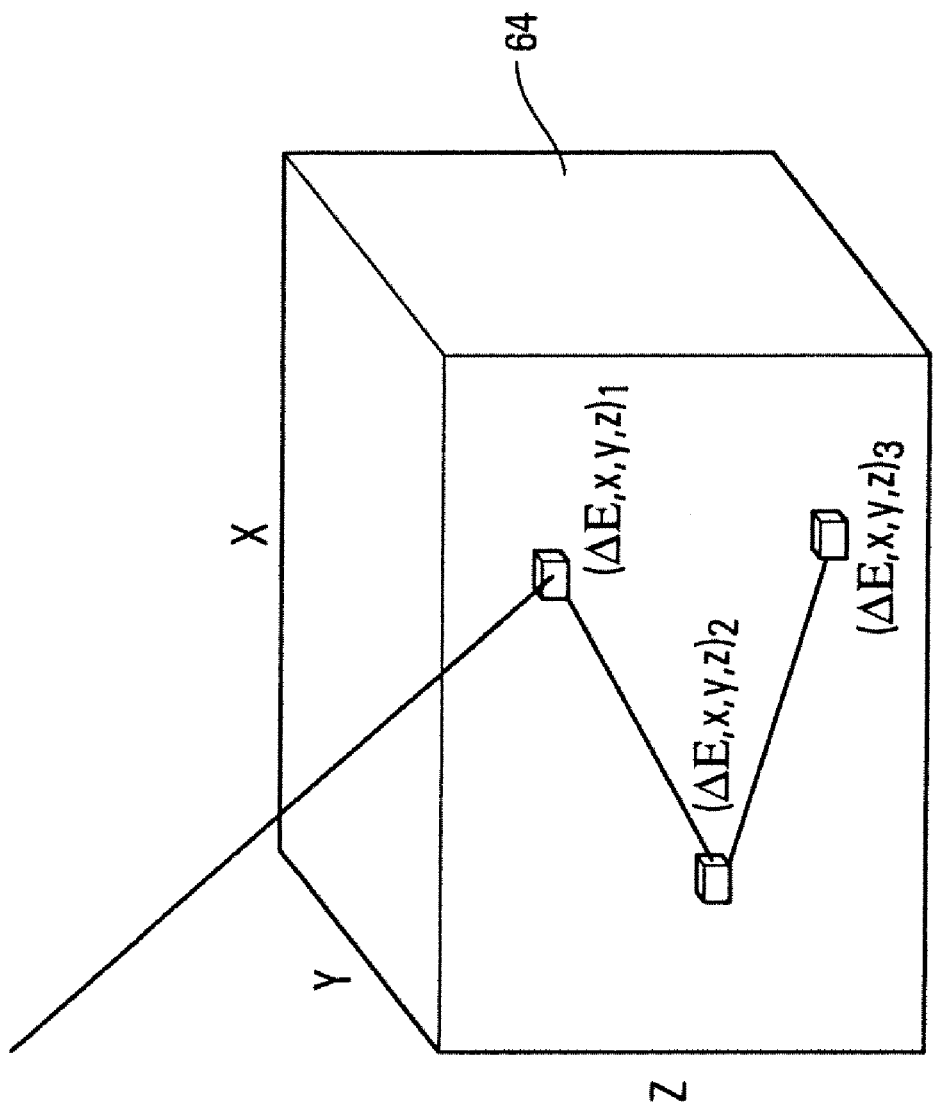
FIG. 3 is a schematic representation of a multiple-pixel event having a plurality of radiation interactions with a semiconductor crystal of the radiation detector of FIG. 1.

The foregoing detector electronics generally support the analysis of multiple-pixel events in which a plurality of radiation interactions occur inside the detector module 26. FIG. 3 depicts a generic detector volume 64 to illustrate a multiple-pixel event for which one or more radiation characteristics are determined in accordance with the disclosed techniques. When interactions occur inside the detector volume, energies $E_1$, $E_2$, . . . are deposited at respective positions $(x_1,y_1,z_1)$, $(x_2,y_2,z_2)$, . . . and, generally speaking, the disclosed techniques provide a method to determine data values for these energies and positions for all of interactions of the multiple-pixel event, i.e., $(E_i,x_i,y_i,z_i)$, with high resolution. To this end, detectors generally use the charge carriers generated via the ionization processes of each radiation interaction as the mechanism of determining the deposited energies and their positions. The number of charge carriers $N_i$ (electron-ion pairs for gaseous detectors, or electron-hole pairs for semi-conductor detectors) is proportional to the energy deposition $E_i$. The radiation detection system 20 generally measures the induced charges on the electrodes to deduce $N_i$ and also $(\bar{x}_i,\bar{y}_i,\bar{z}_i)$—the centroid position of the charge carriers of the i-th interaction. The centroid position $(\bar{x}_i,\bar{y}_i,\bar{z}_i)$ may be regarded as a good approximation of the actual position of i-th interaction $(x_i,y_i,z_i)$ and is also determinative of the position resolution.

Figure 4:
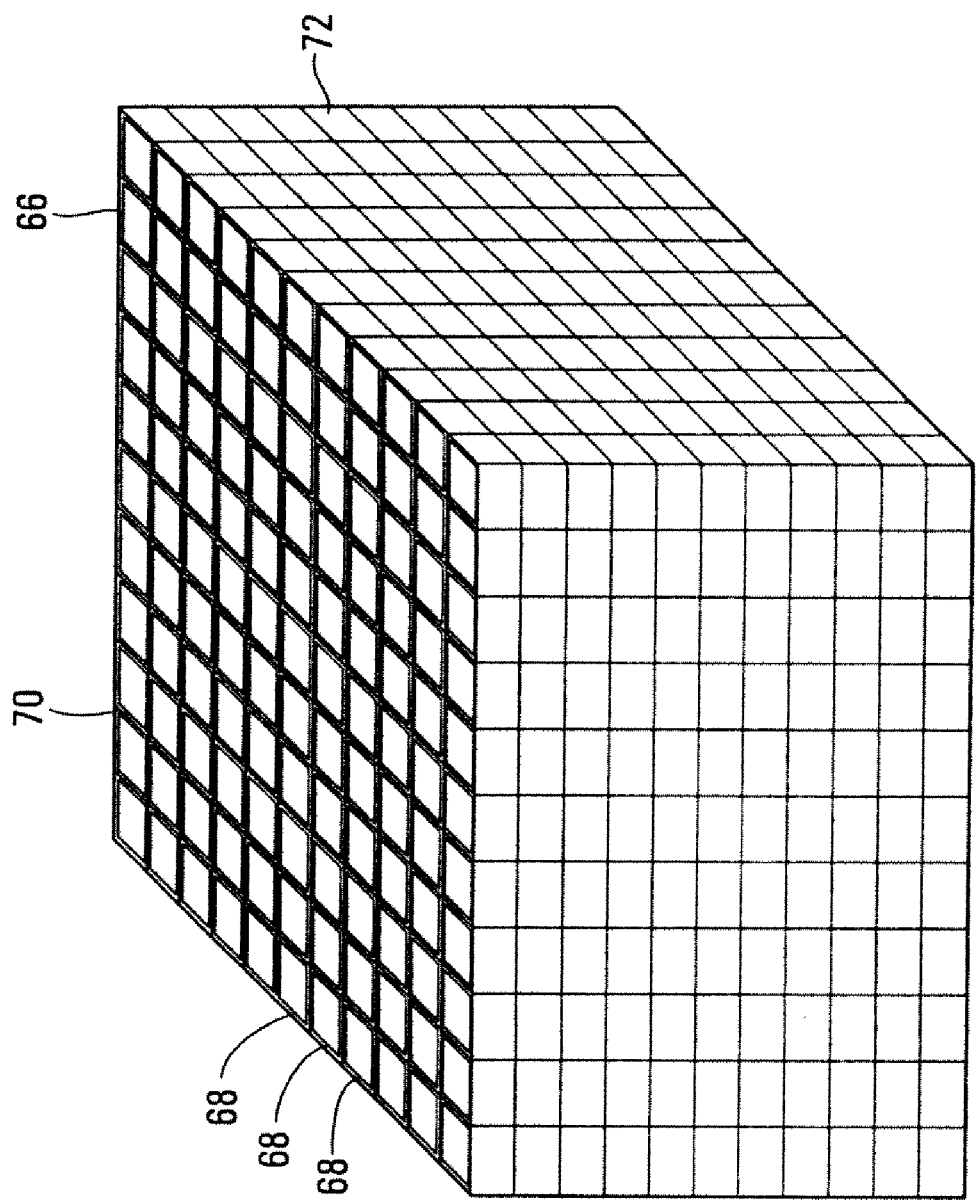
FIG. 4 is a schematic representation of the semiconductor crystal of FIG. 3 showing a multiple-pixel anode configuration and a volumetric division of the crystal for three-dimensional position sensing.

With reference now to FIG. 4, and as set forth above, the detector module 26 uses a pixelated anode pattern 66 (e.g., 11×11) and a conventional planar cathode disposed on an opposing side (not shown). The anode pixel pitch in one exemplary embodiment is 1.27 mm. Between pixel anodes 68, the pattern 66 includes a common grid 70 biased at negative voltage to focus the electrons to the pixel anodes 68. The trace width of the grid electrode may be, for instance, about 100 μm with a gap of about 200 μm between the grid 70 and the pixel 68.

Employing a pixelated anode electrode provides a way of reading out both the amplitude of the induced charge signal and the (x, y) coordinates for each specific interaction. The z coordinate may be obtained by measuring how long it takes the electrons to drift from where they are generated to where they are collected at the anode pixel 68. Generally speaking, pulse waveform analysis may be applied to both the pixel anode signal and the cathode signal to get the deposited energy and the interaction depth z. By choosing proper time-shaping and/or other signal processing techniques, the cathode signal may be made sensitive to both the number of electrons generated in the ionization process and the drift length of the electrons before collection by the anode pixel 68. Meanwhile, the anode signal is only sensitive to the number of electrons generated. Therefore, the ratio of the cathode signal to the anode signal (or other forms of functions of the two signals) may provide the interaction depth z. Based on the foregoing and the procedures described below, the disclosed technique addresses the correction of variation in detector response due to electron trapping, material non-uniformity and weighting potential variations.

The parameters underlying the computation or acquisition of the aforementioned radiation characteristics are now described in connection with the detection of single-pixel events. Based on that discussion, the parameters and computations may then be extended and applied to the multiple-pixel event detection context.

A detector generally has X×Y×Z dimensions, a planar cathode and N×M pixelated anodes. If the expected and achievable depth resolution is Δz, the whole active detector volume may be virtually divided into N×M×D voxels, where $$D = \frac{Z}{\Delta z}.$$

As schematically shown in FIG. 4, each voxel 72 has a very small volume (compared to the total detection volume) such that the detector response changes very little within each of the voxels 72. It follows that the average detector response in each voxel 72 may be used as the actual detector response within the whole voxel 72. While the dimension of the voxel 72 and the variation of detector response inside each voxel 72 delimit the achievable position resolution and energy resolution of this detector, practice of the disclosed techniques is not limited to any particular voxel size or dimension.

By using one or more calibrations for every pixel (x, y), the detector response coefficients A(x, y, z) for all depths of interaction may be found that satisfy the relation Q(x, y, z)=A(x, y, z)E where Q(x, y, z) is the induced charge signal on the pixel electrode at (x,y) when a single-interaction event occurs and deposits energy E under pixel (x, y) at depth z. The output signal from the readout electronics 24 (FIG. 1), S(x, y), should have a monotonic relationship (a linear relationship is typical) to Q(x, y). Thus, the measurement on S(x, y) may be used to deduce the corresponding Q(x, y). This monotonic relationship is given by the readout electronics response, which may be calibrated using one or more calibration data sets. The calibration procedures to generate the data sets generally apply a source of known energy $E_0$, to the detector volume followed by the measurement of the electronic output signal S(x, y). Using the relationship between S(x, y) and the induced charge on each electrode Q(x, y), one may obtain the relationship between Q(x, y, z) and the known energy $E_0$ and thus the system response coefficients A(x, y, z).

Based on the foregoing generalized analysis, each calibration step or procedure is useful as an event reconstruction mechanism, in the sense that the original information carried by the radiation and conveyed via the detector interaction (e.g., deposited energy, position, etc.) must proceed all the way through the radiation ionization process in the detector medium, the charge carrier transportation in the detector, and the charge induction process, and then finally be processed by the readout electronics. The information will naturally be distorted via these processes, due to, for instance, random nature of charge generation, position dependence on charge trapping and induction, and discretization of, and variations in, the readout electronics, such as baseline offset, gain drift and non-linearity.

In order to reconstruct the original information of each radiation interaction, one or more corrections (or correction factors) are introduced to address the aforementioned distortions introduced into the signal chain. One or more of the correction factors may be specified or generated via the disclosed calibration techniques. With these techniques, the limitations of the detector system 20 may be removed to reveal the most accurate representation of the information possible given the energy resolution and the position resolution of the interaction. As described above, the corrections may be affected via fitted or other functions the parameters of which may have been specified as a result of the disclosed calibration techniques. Accordingly, the determination of characteristics of the radiation and any one or more of the correction factors may be implemented via data look-up tables or, in other cases, one or more functions derived from the calibration techniques disclosed herein.

The readout electronics generally provides two groups of signals—the amplitude and timing signals. Therefore, the calibration of the readout system has two corresponding categories. The first calibration category involves a determination of the relationship between the input charge pulse amplitude Q and the output signal amplitude S. The calibration of the signal amplitude normally includes the calibration on baseline offset, gain and linearity, and their drift under different conditions such as count rate, time and temperature. The goal of these calibrations is to find out the true input signal corresponding to the recorded output signal. The second calibration category involves the relationship between the input pulse timing t and the output timing signal T. The calibration of the timing signal normally includes the calibration on the time-to-amplitude gain and the time-amplitude-walk. If leading edge triggering circuitry is used for the electron drift time determination, the problem of time-amplitude walk may be corrected via techniques known to those skilled in the art. In some cases, in order to get the true timing signal for any pulse amplitude, the time-amplitude walk should be calibrated. Although there are multiple ways in which to address this calibration, further information is set forth below in connection with the exemplary embodiment depicted in FIG. 8. Practice of the disclosed techniques, however, is not limited to any one way or mechanism of addressing the time-amplitude walk.

In general, calibration directed to the signal amplitudes may proceed using a single, known gamma-ray energy to represent the detector response for the entire energy range of interest. A gamma-ray source with a single and high-energy emission may be used to create a spectrum in which the photopeak is more easily located. The high energy allows the gamma ray to penetrate deep into the detector to ensure that the detector response at all depths is calibrated. For example, the calibration techniques disclosed herein may conveniently use $^{137}$Cs as a calibration source in view of its simple 662 keV photopeak. However, other sources may be used for the calibration such that implementation of the disclosed system and method is not limited to any one particular source.

The calibration techniques disclosed herein generally address two effects presented by multiple-pixel events, namely (i) position dependence due to charge trapping and variation of the weighting potential, and (ii) the signal deficit arising from weighting potential cross-talk between multiple interactions.

The manner in which radiation characteristics are determined in single-pixel events is now described. The calculation of the interaction depth and the parameter relationships leading thereto may then be utilized in the multiple-pixel event context.

Figure 5:
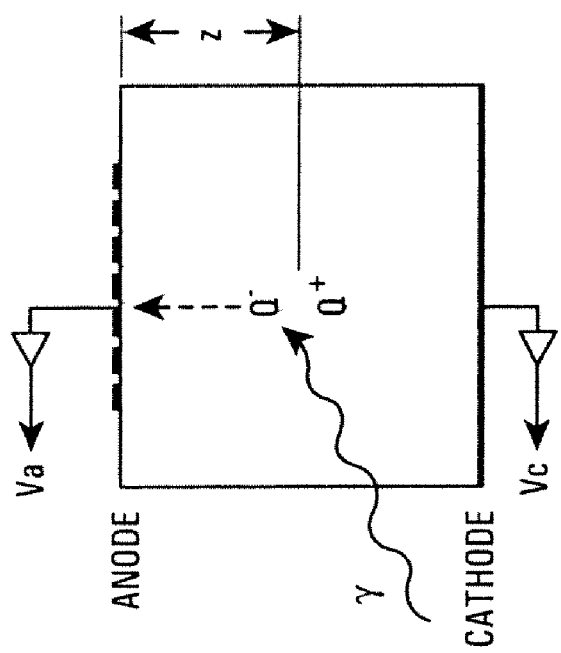
FIG. 5 is a schematic representation of a cross-sectional, partial view of the radiation detector of FIG. 1 in connection with the detection of a single-pixel event.

FIG. 5 shows the technique of interaction depth sensing using the ratio between the cathode signal and the anode pixel signal when only one interaction occurs in the detector. For an energy deposition arising from an interaction of a gamma ray in the detector at depth z, both the anode signal $V_a$ and the cathode signal $V_c$ are read out. Because of the single-polarity charge sensing, $V_a$ should be approximately proportional to the number of electrons generated by the interaction. Because the cathode is a conventional planar electrode, $V_c$ should be proportional to the product of the interaction depth and the number of electrons. Therefore, the ratio of $V_c$ to $V_a$ will be proportional to the interaction depth z.

Figure 6:
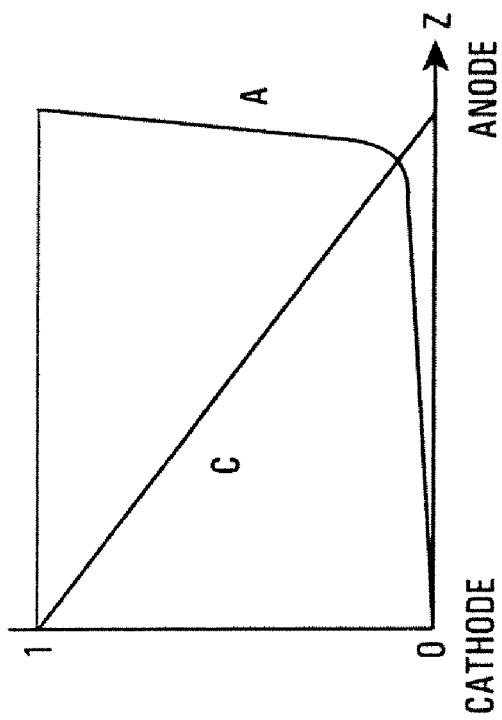
FIG. 6 is a plot of normalized signals induced or generated in connection with the detection of the single-pixel event depicted in FIG. 5.

FIG. 6 illustrates the nature of the single-polarity charge sensing technique underlying this determination. More specifically, FIG. 6 shows the difference in the induced charge on the anode pixel and the cathode as a function of depth, while illustrating the linear depth dependence of the cathode signal and the weak depth dependence of the anode pixel signal.

Figure 7:
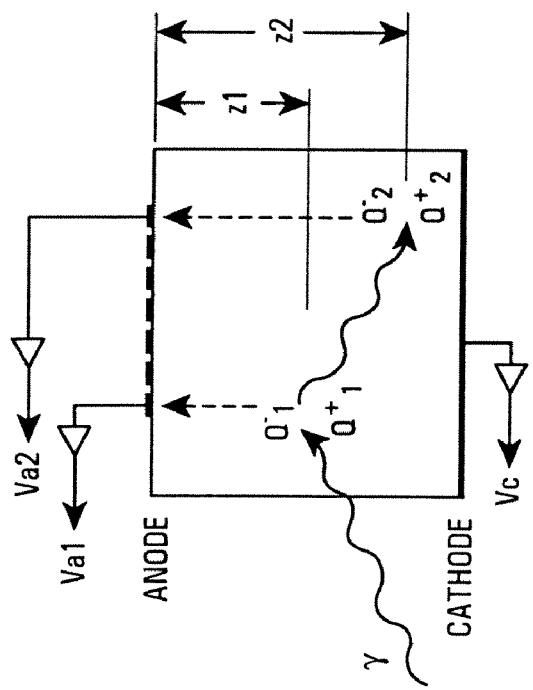
FIG. 7 is a schematic representation of a cross-sectional, partial view of the radiation detector of FIG. 1 in connection with the detection of a multiple-pixel event.

Turning to the multiple-pixel event context, FIG. 7 depicts a pair of gamma ray interactions within the detector volume at depths $z_1$ and $z_2$. For these multiple interactions, the cathode signal is contributed by multiple energy depositions and thus cannot be used alone to obtain the interaction depth for each individual interaction. Fortunately, because the electrons drift at a nearly constant velocity in the detector, electron drift times may be determined and recorded to enable the determination of the interaction depth information for all interactions of the event.

One way in which the electron drift time may be measured or determined is now described. Practice of the disclosed techniques, however, is not limited to any one drift time determination or calculation methodology. When a gamma ray interacts inside the detector and the electron clouds start to drift, a cathode trigger is generated when the induced signal on the cathode crosses a threshold. When an electron cloud arrives in the vicinity of an anode pixel, the induced signal crosses a threshold, and triggers the corresponding anode pixel. The individual electron cloud drift times may then be derived from the time difference between the cathode trigger and the anode triggers.

Figure 8:
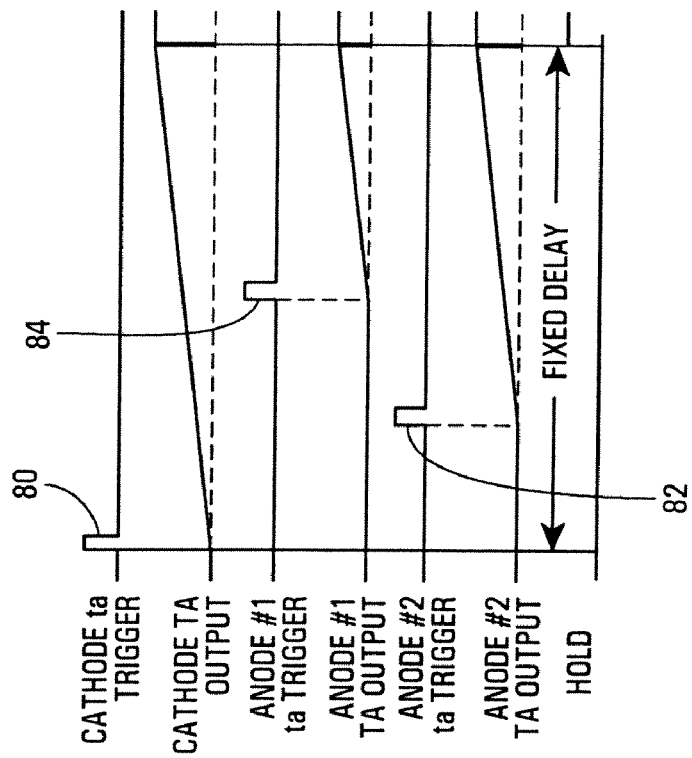
FIG. 8 is a multi-variable plot of signals induced or generated in connection with the detection of the multiple-pixel event depicted in FIG. 7.

The multivariate plot of FIG. 8 illustrates the timing sequences of these electron drift time measurements for multiple-pixel events. Starting at the top level of the plot, a trigger pulse 80 is induced (i.e., generated) by the TAT channel for the cathode when a gamma-ray interacts in the detector. The electron clouds start to drift, and the induced signal on the cathode crosses a threshold. The trigger pulse 80 starts the TAC 62 (FIG. 2) in the TAT cathode channel and generates a system trigger (i.e., associated with the HOLD pulse shown at the bottom of the plot). When an electron cloud eventually drifts sufficiently near an anode pixel, the induced signal crosses a threshold, and triggers the corresponding TAT channel with a pulse 82. This trigger pulse 82 starts the TAC corresponding to that anode pixel channel. One or more additional anode pixels may also be triggered (see, e.g., pulse 84). After a fixed delay after the system trigger, all the channels are read out in serial mode through a multiplexer built into the chipsets 28, 30. By using peak-hold in addition to sample-hold circuitry, the pulse amplitude of the multiple-pixel events with different electron drift times (i.e., different peaking times) may be read. The individual electron cloud drift times may then be derived from the timing signal generated by the TACs in the TAT channels (i.e., as the time difference between the cathode trigger and the anode trigger).

Figure 9:
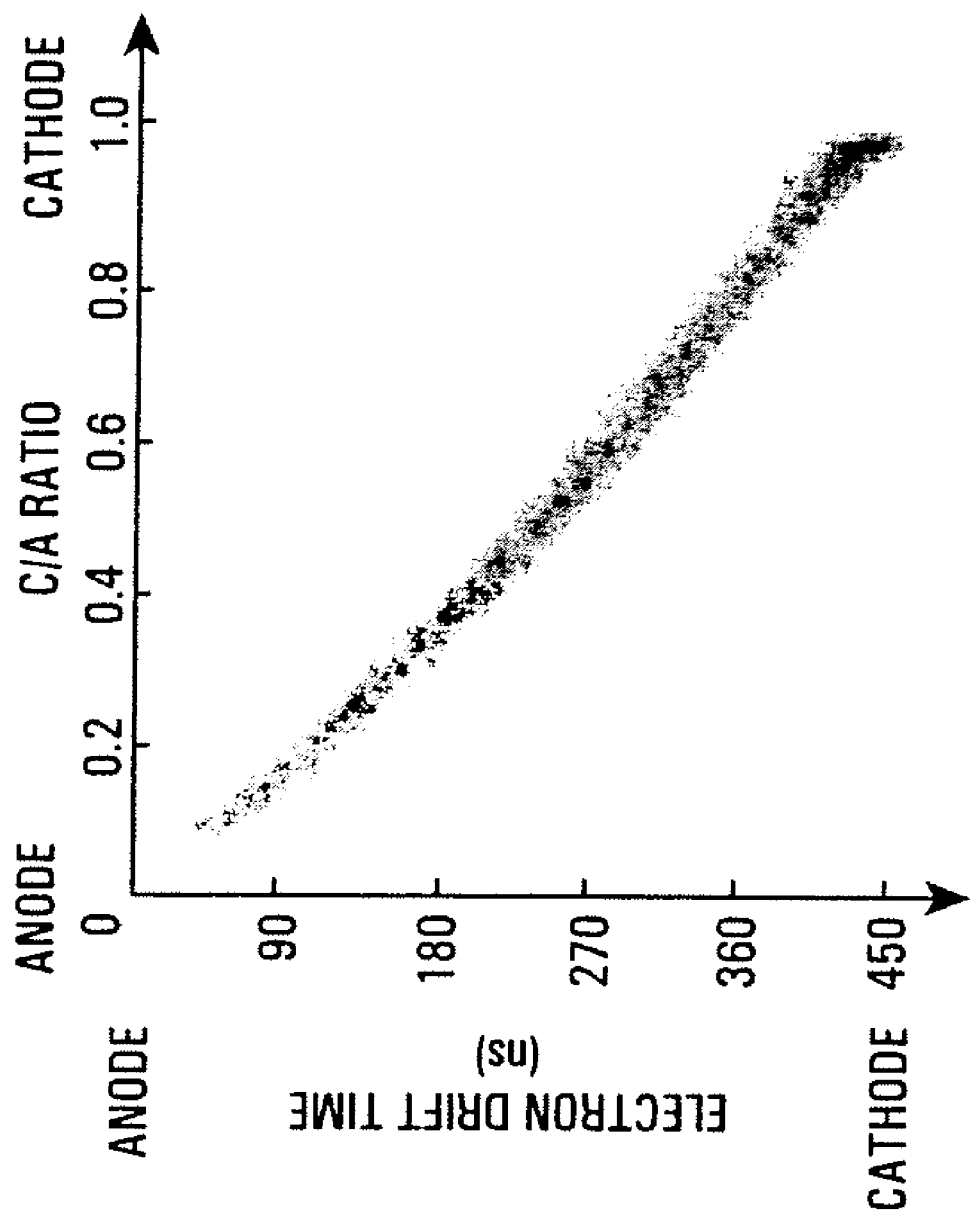
FIG. 9 is a plot of exemplary empirical data correlating electron drift times with cathode-to-anode signal ratios arising from single-pixel events detected by an exemplary radiation detector and for use in connection with one aspect of the disclosure.

As described above, for single-pixel events, the ratio of the cathode signal and the anode signal may be used to get the interaction depth. This depth information may then be used to sort the events into spectra for different depths. Following that, the spectra from all the depths may be combined by aligning the photopeak (e.g., 662 keV) to the same position. As a result, the material non-uniformity and the variations in electron trapping and weighting potential are corrected down to the limit of the position resolution over the whole detector volume. For multiple-pixel events, although we can only get the interaction depth from the electron drift time, depth correction coefficients derived from the C/A ratio in the single-pixel events calibration are used as described below. Thus, the relation between the C/A ratio and the electron drift time is first determined for single-pixel events via empirical data such as that shown in FIG. 9. Then, for multiple-pixel events, the equivalent C/A ratio is deduced from the electron drift time for each pixel. As a result, mapping the electron drift time to the C/A ratio and using the depth correction coefficients derived from the C/A ratio result in better energy resolution than only using the electron drift time.

Figure 10:
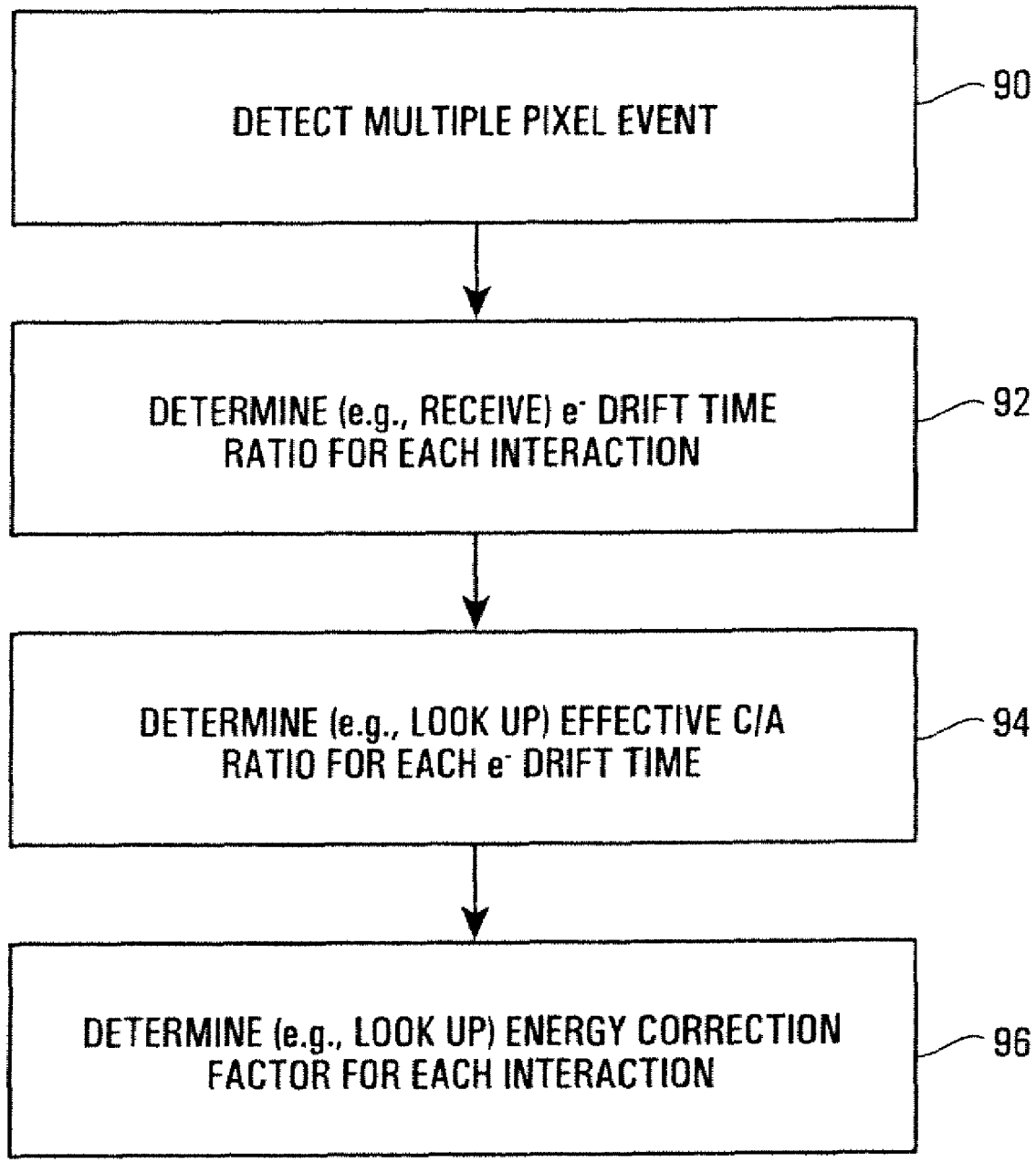
FIG. 10 is a block diagram of a radiation detection technique for multiple-pixel events in accordance with one aspect of the disclosure.

The steps taken to apply the depth correction factor are shown in accordance with one aspect of the disclosure in FIG. 10. After a multiple-pixel event is detected in a block 90, the above-described or similar signal processing may be implemented to determine the electron drift time data for each interaction in a block 92. A block 94 then determines the above-described correlation between the drift times and the C/A ratio by, for instance, accessing a look-up table, database or data set (see, e.g., the calibration database 42 shown in FIG. 1). Using the correction factor, a block 96 may then determine the energy of the interaction, or some other radiation characteristic, with improved resolution. Alternatively, or in addition, the correlation may be used to determine the interaction depth, as discussed above based on the C/A ratio. To that end, another look-up table, database or data set may be accessed to determine the interaction depth corresponding with the C/A ratio determined from the drift time data.

In some embodiments, the correction factors may be specified on a pixel-specific basis. In this way, material non-uniformities may be addressed. Alternatively, the database or data set may incorporate approximations, averaging or other data processing to minimize the storage size of the data set, or for any other desired purpose (e.g., calculation speed for real-time processing).

There may be one or more additional corrections supported by calibration of the radiation detector. Two examples are corrections for baseline drift and gain drift.

Some embodiments may also benefit from a nonlinearity correction. Although the dynamic range of the VAS channels accommodates energy deposition up to 1 MeV, the VAS channels may exhibit nonlinearity at energies as low as 662 keV. Thus, an energy calibration using multiple energy sources may be carried out. For multiple-pixel events, because the total deposited energy is derived from the sum of the deposited energy by each individual interaction, an accurate energy calibration may facilitate good energy resolution.

Yet more benefits may result from a timing amplitude-walk correction, as described above. Timing amplitude-walk may be present for both the anode and cathode timing signals. To get a more accurate electron drift time for multiple-pixel events over the whole energy range, a timing calibration may be performed for all channels.

It should be noted that, in cases where the electron drift time is not a linear function of the depth of interaction, then the cathode-to-anode signal ratio may be used as an indication of the depth of interaction.

Yet another correction factor involves a weighting potential cross-talk effect between the interactions of a multiple-pixel event. More specifically, this correction step may correct for signal deficits arising from cross-talk between interactions in multiple-pixel events, as described below.

For multiple-pixel events, the electron drift time may be used to get the interaction depth $z_i$. The deposited energy $E_i$ may be first estimated using equation $$E'_i = \frac{Q_i(x_i, y_i, z_i)}{A(x_i, y_i, z_i)}$$

for each pixel. However, due to a cross-talk of the weighting-potential, each $Q_i(x_i, y_i, z_i)$ is less than that corresponding to the true deposited energy $E_i$. Generally speaking, the cross-talk may arise from the induced effect of one electron cloud on the anode pixel associated with another interaction. A weighting-potential cross-talk calibration may be done to correct this signal deficit. The calibration is generally based on the separation between the pixels involved in the multiple-pixel event as well as the interaction depth of the interaction constituting the source of the deficit (i.e., via cross-talk with its electron cloud). Alternatively, the correction factor data may be stored as a function of the interaction depths for both of the interactions involved in the cross-talk. In other cases, the energy-weighted centroid depth may be used to determine the correction factor for weighting potential cross-talk (rather than one or both of the individual interaction depths).

The cross-talk correction factor may also be based on the relative lateral positioning of the affected pixels. In one embodiment, the correction factor is a function of whether both affected pixels are disposed on a periphery of the anode. See, for example, each of the anode pixels 68 depicted in FIG. 4. A non-peripheral anode pixel may be one disposed in an interior portion of the anode, e.g., the pixels found in a 3×3 pixel square in the center of the anode. In some embodiments, the correction factor may also be a function of whether either of the involved pixels are in a corner of the anode. In any event, the correction factor data may then be stored for each of several possible configurations of the multiple-pixel event. For example, different correction factors may be applicable to otherwise identical events (i.e., same lateral distances, same interaction depth(s)) because one event has two peripheral interactions, and the other event has one peripheral interaction and one interior interaction, two interior interactions, or any one of a number of other possibilities if an interaction may fall into a non-peripheral, non-interior or non-corner category. Alternatively, the correction factor may only look to the lateral positioning of one of the interactions.

Figure 11:
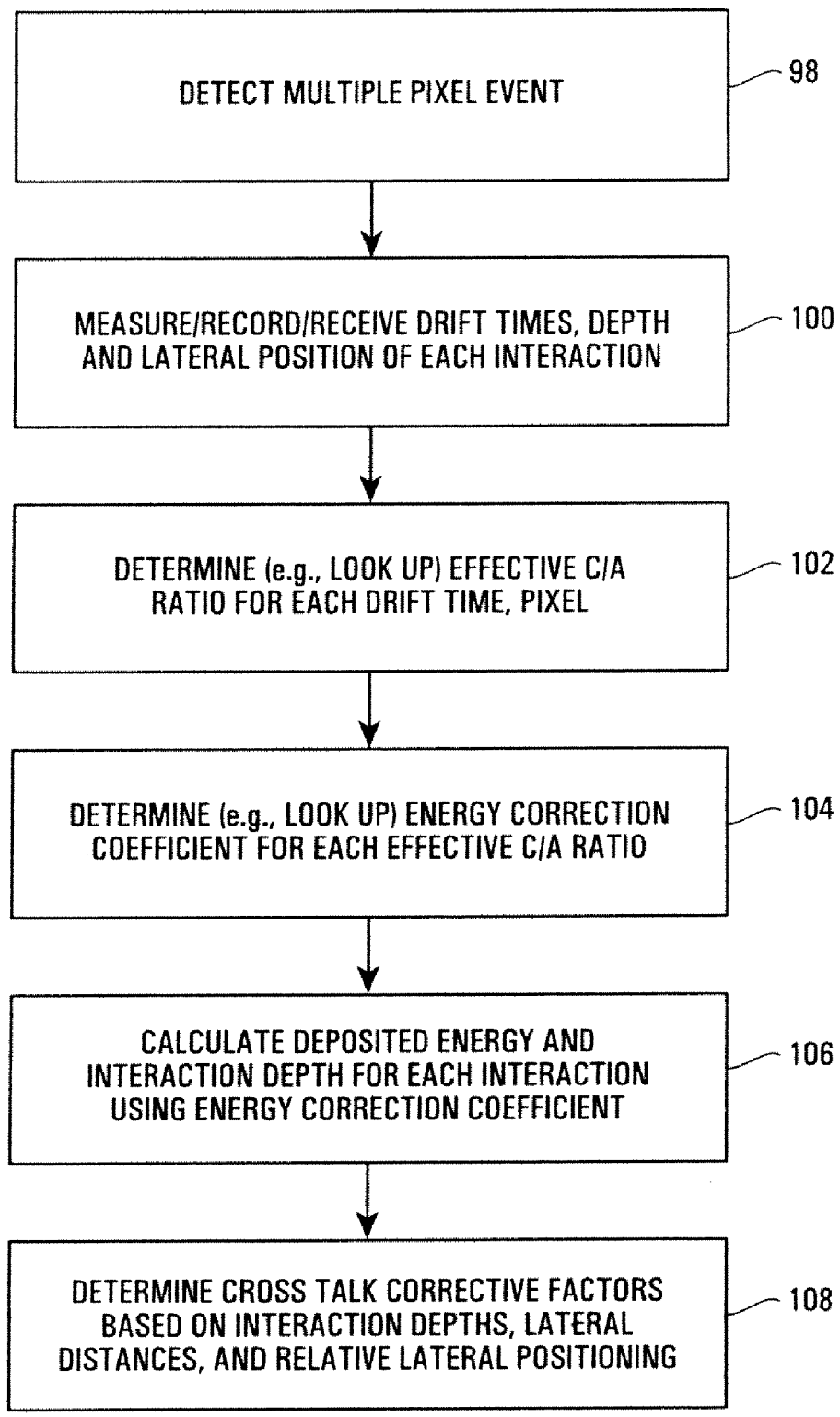
FIG. 11 is a block diagram of a radiation detection technique for multiple-pixel events in accordance with another aspect of the disclosure.

With reference now to FIG. 11, use of the cross-talk correction factor involves the detection of a multiple-pixel event in a block 98, after which the electron drift time data is measured, determined and otherwise processed in a block 100. Next, one or more first-order corrections may be implemented in a block 102, such that, for instance, a C/A ratio is determined from the electron drift time and the pixel involved (see, e.g., FIG. 10). A block 104 may then access one of the databases or data sets to determine the correction factor associated with the C/A ratio determined by the block 102. From that factor, the interaction depth and a preliminary value of the energy may be calculated for each interaction in a block 106. Lastly, the preliminary energy value is adjusted via the cross-talk correction factor in a block 108, which, as described above, may be stored as a function of (and therefore determined by) one or more of the interaction depths, the lateral distances between the affected pixels, and the relative or absolute lateral positioning of one or more of the affected pixels.

In one embodiment, the cross-talk correction factor may be determined for a multiple-pixel event having more than two interactions by averaging the factors determined for each pair of interactions. Alternatively, the cross-talk correction factors may be summed or otherwise combined for each interaction. In these ways, the database or data set of correction factors may avoid the challenge of storing data for every possible combination of, for example, three- or four-pixel interaction sets.

Generally speaking, the calibration of a radiation detector in accordance with the disclosed techniques may use any source, as described above, such as $^{137}$Cs 662 keV gamma-rays. The manner in which sufficient data is generated and collected for both single-pixel events and multiple-pixel events is shown in connection with exemplary embodiments in FIGS. 12 and 13.

For the generation of the depth correction factor based on the C/A ratio, single-pixel photopeak events of a known energy (such as 662 keV) in this calibration are used. Because each value of electron drift time corresponds to a particular depth of interaction, and thus a particular value of C/A signal ratio, a plot of electron drift time versus C/A signal ratio may be generated to obtain the relationship between electron drift time and C/A ratio. As a result, the depth of interaction corresponding to any C/A signal ratio may be determined from a measured electron drift time.

Figure 12:
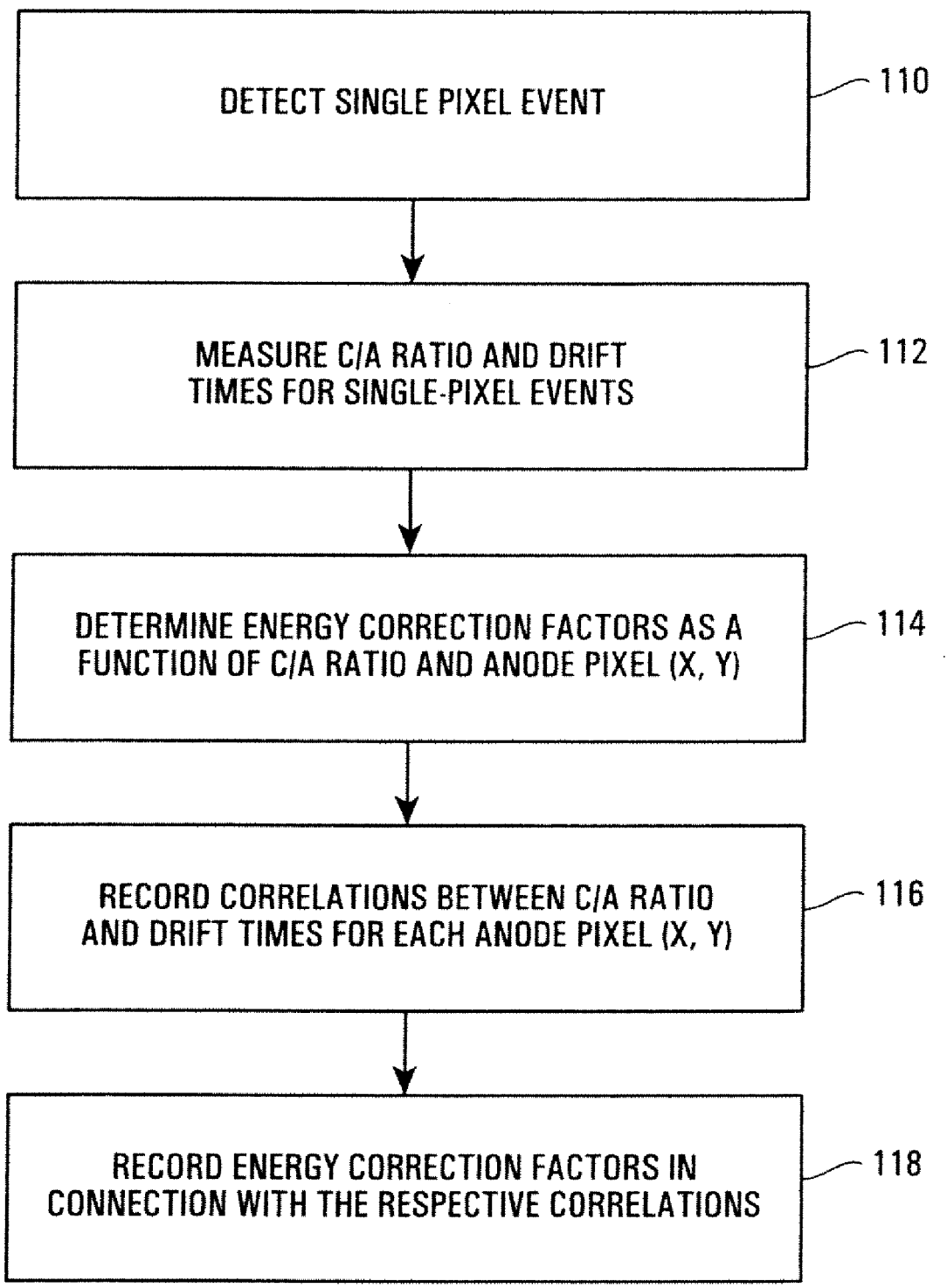
FIG. 12 is a block diagram of a radiation detector calibration technique for support of the detection technique of FIG. 10 and in accordance with one aspect of the disclosure.

Referring to FIG. 12, raw spectrum data is collected for each anode pixel (after correction for the electronics response so that the signal is linearly proportional to the induced signal on the anode pixel) to develop depth separated spectra. With each event that makes up the collective spectrum, a single-pixel event is detected in a block 110 and the C/A ratio and drift times are measured in a block 112.

The raw spectrum has a broadened photopeak because of the electron trapping and weighting potential effect. For each pixel, every single-pixel event will be added into a depth spectrum according to its cathode to anode signal ratio (C/A ratio). Because each depth spectrum has a very sharp, known photopeak, the broadened photopeak should be corrected to correspond to the known (e.g., 662 keV) energy deposition. Therefore, the energy correction factors are determined in a block 114 by, for instance, measuring the centroids of these photopeaks and determining the correction factor to each depth spectrum needed to combine them into the final spectrum so that all photopeaks will be aligned to the same location and form a sharp peak in the final corrected spectrum.

To wrap up the calibration procedure, the correlations between the C/A ratios and both the electron drift times and the energy correction factors are stored or recorded in any desired manner in blocks 116 and 118, respectively.

Figure 13:
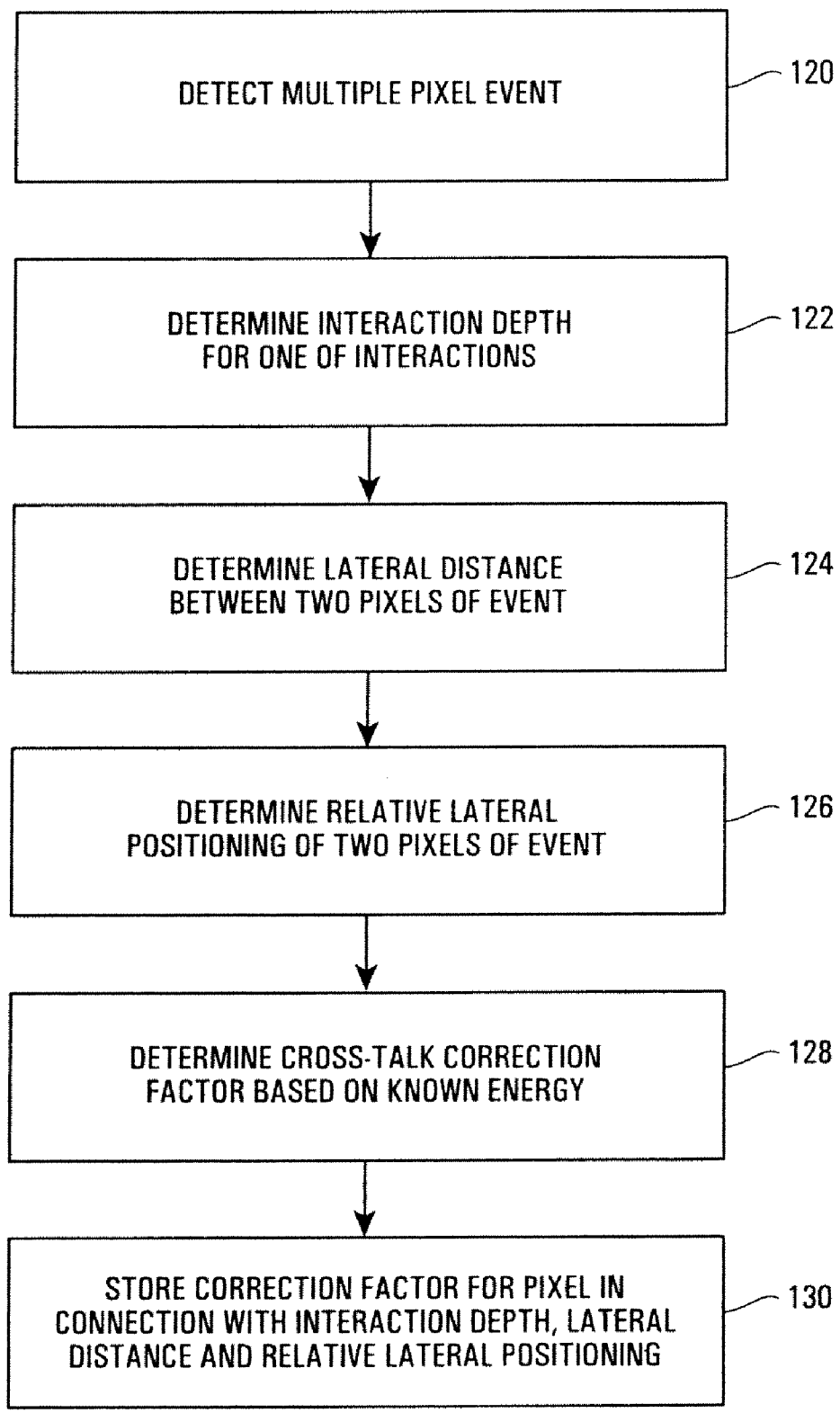
FIG. 13 is a block diagram of another radiation detector calibration technique for support of the detection technique of FIG. 11 and in accordance with another aspect of the disclosure; and, FIGS. 14A-14C are energy spectra plots generated by an exemplary detector for single-pixel events, two-pixel events and three-pixel events, respectively.

Turning to FIG. 13, the calibration of a radiation detector to address the cross-talk between interactions of a multiple-pixel event begins with the detection of the event in a block 120. The interaction depths are then determined via, for instance, the procedure described above, in a block 122. In this embodiment, the lateral distance between the anode pixels and the relative lateral positioning of the pixels are then determined in blocks 124 and 126 to support the correction factor determination. Using the known energy, and relying on the energy calculated for the interaction using any of the other calibrations described herein, the cross-talk correction factor is then determined for the given event data in a block 128. After storing the correction factor in association with the event data in a block 130, further data may then be collected to cover different anode pixel combinations, different interaction depths, etc.

Two CZT detectors of identical dimensions were tested to evaluate the implementation of one or more of the foregoing techniques. Gamma-ray events from Cs 662 keV were collected and analyzed. The cathode bias voltage was chosen for the stability of the cathode signal. The grid bias voltage was based on an electric field calculation to prevent charge sharing on the grid electrodes. The first detector was biased at 2200 V on the cathode and 85 V on the anode grid. The second detector was biased at 2000 V on the cathode and 80 V on the anode grid. The anode pixels were at ground potential and connected to the input of the ASIC by wire-bonds. Both detectors were irradiated from the cathode side with gamma-ray sources placed 5 cm away from the cathode. The resulting Cs 662 keV gamma-ray spectra shown in FIGS. 14A-14C were acquired over 40 h for each detector. Spectra from Ba, Co and Na gamma-ray sources were also collected to support a nonlinearity calibration. After the corrections based on the correlation between C/A ratio and electron drift time (but not the cross-talk), the energy resolution (FWHM) for single-pixel and multiple-pixel events over the whole volume of each detector were as shown in Table 1 below.

TABLE 1

| Detector | Single-Pixel Events | Two-Pixel Events | Three-Pixel Events | Four-Pixel Events |
| --- | --- | --- | --- | --- |
| 1 @ −2200 V, −85 V | 1.11% (7.3 keV) | 1.57% (10.4 keV) | 2.13% (14.1 keV) | 2.64% (17.5 keV) |
| 2 @ −2000 V, −80 V | 1.14% (7.5 keV) | 1.64% (10.9 keV) | 2.28% (15.1 keV) | 2.81% (18.6 keV) |

Figure 14A:
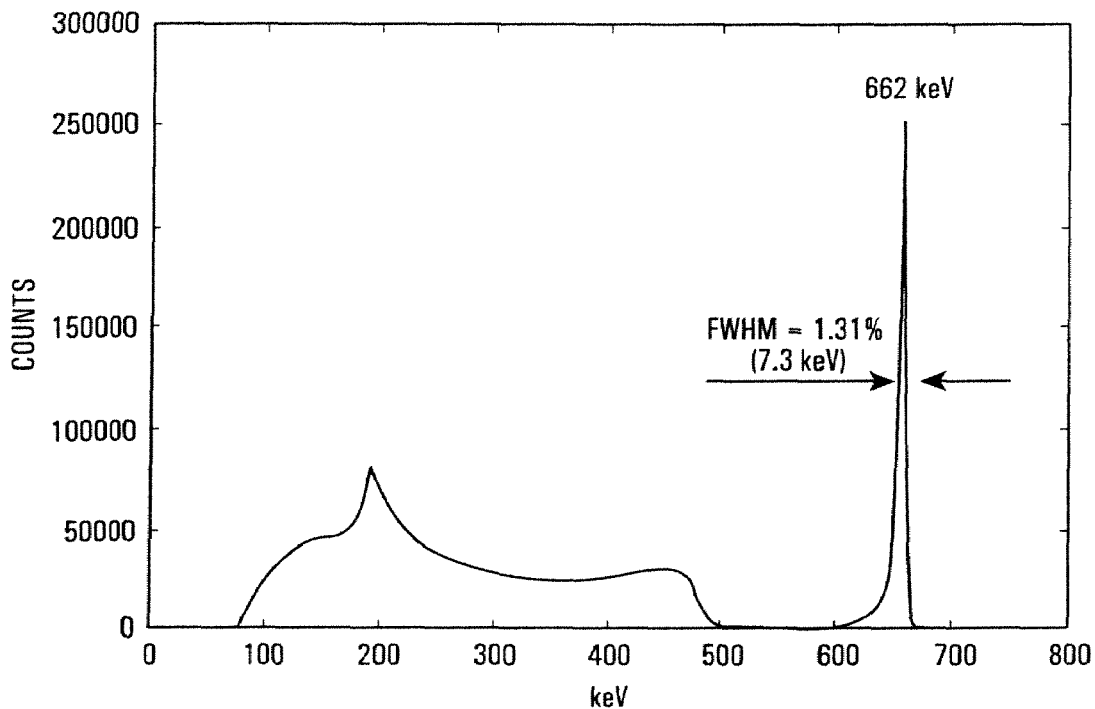
Figure 14B:
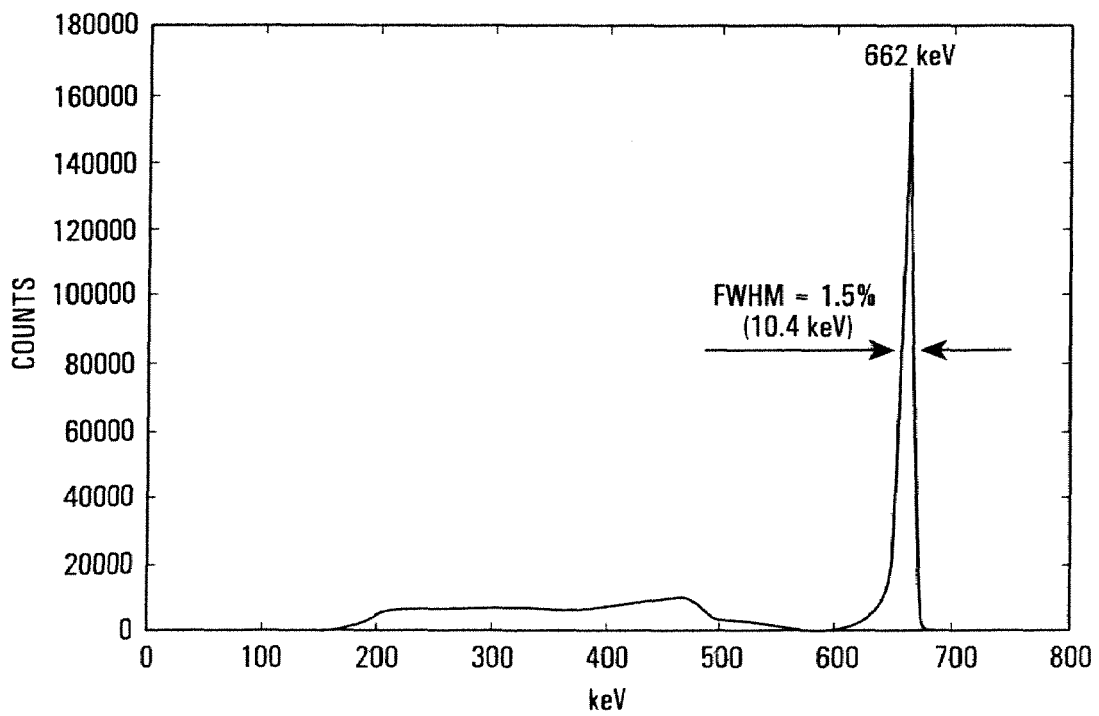
Figure 14C:
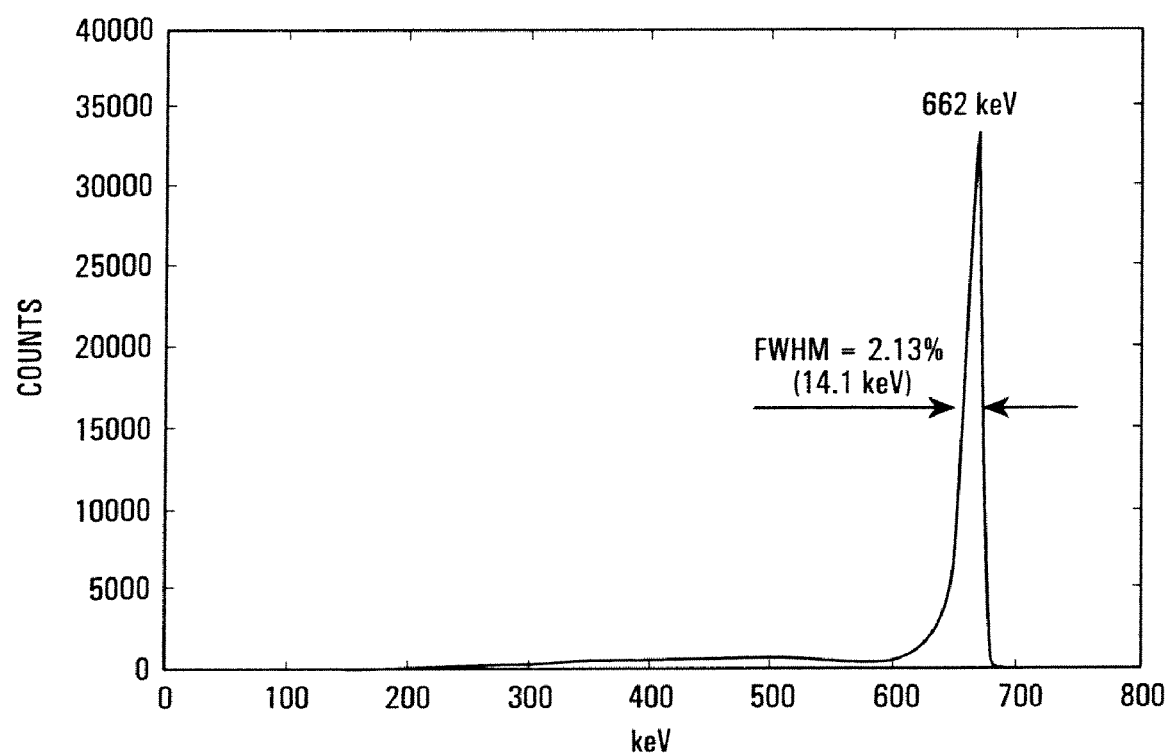

The overall spectra for single-pixel events, two-pixel events and three-pixel events from the entire first detector are shown in FIGS. 14A-14C. The rather complete absorption of the gamma-ray for multiple-pixel events is evident from the lack of background counts in FIGS. 14(b) and (c), which also demonstrates a beneficial capability of the gamma-ray spectroscopy enabled by the techniques disclosed herein, namely implementing event selection based on the signatures of the interactions of a multiple-pixel event.

Two further exemplary CZT detectors were also tested, where electronic noise was addressed via modifications to the front-end board. The modifications to the connections configuration reduced cross-talk noise on the cathode signal induced by digital control signals. Further, unlike the prior exemplary detectors, the detection scheme was not limited by one global threshold for all the channels reading signals from anode pixels. Rather, in these cases, the anode pixels had triggering thresholds ranging from 50 keV to 80 keV, with the spread caused by the variations of DC offsets and noise in each ASIC channel. To this end, a 4-bit digital-to-analog converter (DAC) unit was added to each TAT channel so that the threshold of each channel could be finely tuned to achieve lower thresholds among the channels.

The first detector of this second exemplary pair was biased at −2200 V on the cathode and the second at −1400 V. The anode pixels were DC-coupled to the ASIC inputs and thus all were at ground potential. The common grid electrode between the pixels was biased at a negative voltage to steer electrons drifting towards the anode pixels. The whole system was operated at room temperature (~23 C). The detector was irradiated from the cathode side with non-collimated gamma-ray sources placed 5 cm away from the cathode. Data collected from a 137Cs gamma-ray source was used for the calibration. Spectra from a 241Am source were also collected for measuring the electron mobility-lifetime products and estimating the electronic noise.

With the help of the disclosed techniques, the material non-uniformity, the weighting potential variations and the electron trapping variations were accommodated to the limit of the position resolution—estimated to be 1.27 mm×1.27 mm×0.2 mm. By implementing the 3-D corrections, unprecedented energy resolutions of 0.93% and 0.76% FWHM at 662 keV for single-pixel events were achieved from the entire 2.25 cm3 volumes of the detectors. As a result of the much lower thresholds than the previous systems, the 32 keV 137Cs K x-rays were also observed in both systems. For multiple-pixel events, the depth of each interaction was derived from the electron drift time for each pixel. After correction for timing-amplitude-walk, electron trapping and non-linearity for each signal, the true energy and 3-D position information were obtained for each interaction. An energy resolution of 1.23% FWHM at 662 keV was achieved for two-pixel events collected from the entire volume of the second detector. The energy resolutions (FWHM) of 662 keV single-pixel and multiple-pixel events are summarized in Table II for the two detectors.

TABLE 2

| Detector | Single-Pixel Events | Two-Pixel Events | Three-Pixel Events |
|---|---|---|---|
| 1 @ −1400 V, −45 V | 0.95% (6.29 keV) | 1.52% (10.06 keV) | 2.67% (17.68 keV) |
| 1 @ −2200 V, −65 V | 0.93% (6.16 keV) | 1.46% (9.67 keV) | 2.41% (15.95 keV) |
| 2 @ −1400 V, −45 V | 0.76% (7.3 keV) | 1.23% (8.14 keV) | 2.3% (15.22 keV) |
| 2 @ −2200 V, −60 V | 0.78% (5.16 keV) | 1.19% (7.88 keV) | 2.08% (13.77 keV) |

Embodiments of the disclosed system and method may be implemented in or involve hardware, firmware or software, or any combination thereof. Some embodiments may include or involve computer programs executing on programmable systems comprising at least one processor, a data storage system (including volatile and non-volatile memory and/or storage elements), at least one input device, and at least one output device. Program code may be applied to input data to perform the functions described herein and generate output information. The output information may be applied to one or more output devices, in known fashion. For purposes of this application, a processing system includes any system that has a processor, such as, for example, a digital signal processor (DSP), a microcontroller, an application specific integrated circuit (ASIC), or a microprocessor.

The programs may be implemented in any high level procedural or object oriented programming language to communicate with a processing system. The programs may also be implemented in assembly or machine language, if desired. In fact, practice of the disclosed system and method is not limited to any particular programming language. In any case, the language may be a compiled or interpreted language.

The programs may be stored on a storage media or device (e.g., floppy disk drive, read only memory (ROM), CD-ROM device, flash memory device, digital versatile disk (DVD), or other storage device) readable by a general or special purpose programmable processing system, for configuring and operating the processing system when the storage media or device is read by the processing system to perform the procedures described herein. Embodiments of the disclosed system and method may also be considered to be implemented as a machine-readable storage medium, configured for use with a processing system, where the storage medium so configured causes the processing system to operate in a specific and predefined manner to perform the functions described herein.

While the present invention has been described with reference to specific examples, which are intended to be illustrative only and not to be limiting of the invention, it will be apparent to those of ordinary skill in the art that changes, additions and/or deletions may be made to the disclosed embodiments without departing from the spirit and scope of the invention.

The foregoing description is given for clearness of understanding only, and no unnecessary limitations should be understood therefrom, as modifications within the scope of the invention may be apparent to those having ordinary skill in the art.

What is claimed is:

1. A method of determining a characteristic of radiation detected by a radiation detector via a multiple-pixel event having a plurality of radiation interactions, the method comprising the steps of:
   the radiation detector determining a cathode-to-anode signal ratio for a selected interaction of the plurality of radiation interactions based on electron drift time data for the selected interaction; and,
   the radiation detector determining the radiation characteristic for the multiple-pixel event based on the cathode-to-anode signal ratio.

2. The method of claim 1, further comprising the step of determining the electron drift time data for the selected interaction, and wherein the radiation characteristic is determined based on both the cathode-to-anode signal ratio and the electron drift time data.

3. The method of claim 1, wherein the radiation characteristic comprises an interaction depth within the radiation detector of the selected interaction.

4. The method of claim 1, wherein the radiation characteristic comprises an energy deposited by the radiation.

5. The method of claim 4, wherein the radiation characteristic determining step comprises the step of correcting data for the energy utilizing a correction coefficient based on the cathode-to-anode signal ratio.

6. The method of claim 1, wherein the cathode-to-anode signal ratio determining step comprises the step of correlating the electron drift time data with the cathode-to-anode signal ratio.

7. The method of claim 6, wherein the correlating step comprises the step of accessing a calibration look-up table correlating electron drift times with corresponding cathode-to-anode signal ratios.

8. The method of claim 7, wherein the corresponding cathode-to-anode signal ratios are based on empirical data from single-pixel interaction events.

9. The method of claim 7, wherein the calibration look-up table specifies a number of energy correction factors corresponding with the cathode-to-anode signal ratios, and wherein the energy correction factors are anode pixel-specific.

10. The method of claim 1, further comprising the step of adjusting the radiation characteristic to correct for a crosstalk effect between the plurality of radiation interactions.

11. The method of claim 10, wherein the correction factor determining step comprises the step of combining multiple correction factors corresponding with multiple respective pixel pairs of the radiation detector with which the radiation interacts in the multiple-pixel event.

12. The method of claim 1, further comprising the step of determining a correction factor for the radiation characteristic based on a centroid depth of the plurality of radiation interactions.

13. The method of claim 1, further comprising the step of determining a correction factor for the radiation characteristic based on a distance between a pair of pixels of the radiation detector with which the radiation interacts in the multiple-pixel event.

14. The method of claim 1, further comprising the step of determining a correction factor for the radiation characteristic based on lateral positioning of a pair of pixels of the radiation detector with which the radiation interacts in the multiple-pixel event.

15. The method of claim 14, wherein the correction factor determining step comprises the step of determining whether one or both of the pair of pixels are disposed along an anode periphery.

16. The method of claim 1, further comprising the step of determining a correction factor for the determined radiation characteristic based on an interaction depth of the plurality of radiation interactions, and a lateral distance between the selected interaction and a further interaction of the plurality of radiation interactions.

17. The method of claim 16, wherein the correction factor is further based on a lateral position of the selected interaction.

18. A method of calibrating a radiation detector using a radiation source having a known energy level, the method comprising the steps of:

the radiation detector determining a lateral distance between anode pixels of the radiation detector involved in a multiple-pixel event arising from radiation from the radiation source interacting with the radiation detector;

the radiation detector calculating a multiple-pixel event correction factor value based on the known energy level of the radiation source; and, storing the calculated correction factor value in association with the lateral distance for the multiple-pixel event.

19. The method of claim 18, further comprising the steps of determining respective interaction depths for first and second interactions of the multiple-pixel event, and storing the calculated correction factor and the lateral distance in association with the respective interaction depths.

20. The method of claim 19, further comprising the step of determining lateral position data for the first and second interactions, and wherein the calculated correction factor is further stored in association with the lateral position data.

21. The method of claim 19, further comprising the steps of:

determining a cathode-to-anode signal ratio for a single-pixel event arising from the radiation from the radiation source interacting with the radiation detector;

determining an electron drift time for the single-pixel event; and, storing a correlation of the electron drift time data and the respective anode-to-cathode signal ratio data.

22. The method of claim 20, wherein the storing step comprises the step of storing a radiation energy correction factor for the single-pixel event in connection with the correlation.

23. The method of claim 18, further comprising the steps of determining a centroid depth for the multiple-pixel event and storing the calculated correction factor value in association with the centroid depth.

* * * * *